(12) United States Patent
Finn et al.

(10) Patent No.: US 7,021,500 B1
(45) Date of Patent: Apr. 4, 2006

(54) TWO-COMPONENT FOAM DISPENSING KIT

(75) Inventors: Clifford J. Finn, Wauwatosa, WI (US); Steven H. Palmert, Brookfield, WI (US)

(73) Assignee: Two-Part Foam Propellants, Inc., Cudahy, WI (US)

( * ) Notice: Subject to any disclaimer, the term of this patent is extended or adjusted under 35 U.S.C. 154(b) by 0 days.

(21) Appl. No.: 10/732,156

(22) Filed: Dec. 10, 2003

Related U.S. Application Data (60) Provisional application No. 60/432,408, filed on Dec. 11, 2002.

(51) Int. Cl.
*B67D 5/60* (2006.01)

(52) U.S. Cl. .............................. 222/145.5; 222/145.4; 222/526

(58) Field of Classification Search .. 222/145.4–145.6, 222/141.1, 145.1, 130, 526–529, 303, 304, 222/30; 239/303, 304; 169/30
See application file for complete search history.

(56) References Cited

U.S. PATENT DOCUMENTS

| | | | | |
|---|---|---|---|---|
| 3,227,322 A | * | 1/1966 | Crain | 222/183 |
| 5,344,051 A | * | 9/1994 | Brown | 222/135 |
| 5,462,204 A | | 10/1995 | Finn | |
| 5,924,599 A | * | 7/1999 | Brown | 222/135 |
| 6,182,868 B1 | | 2/2001 | Hurray et al. | |
| 6,283,221 B1 | * | 9/2001 | Hurray et al. | 169/30 |
| 6,564,973 B1 | * | 5/2003 | Brown et al. | 222/145.1 |
| RE38,377 E | * | 1/2004 | Geshay | 222/105 |

\* cited by examiner

*Primary Examiner*—Michael Mar
*Assistant Examiner*—Sonia N. Khaira
(74) *Attorney, Agent, or Firm*—Quarles & Brady LLP (57) ABSTRACT

A transportable two-component fluid dispensing kit. The kit includes a container having a front panel and rear panel joined by side panels to form a chamber. Each of the panels have a top edge and a bottom edge joined by side edges, each of the side edges are connected to an adjacent side edge to form the chamber. At least one bottom panel having an edge joined to one of the bottom edges closes over the bottom of the chamber. In one embodiment, the front panel top edge includes a cut out to form an access opening. A top panel having a rearward edge joined to the top edge of the rearward panel closes over the top of the chamber, and top side panels extending downwardly from a forward edge and side edges of the top panel overlaps the front panel cut out and the side panels of said chamber. In another embodiment, a handle for maintaining a space between valves fixed to pressure vessels received in the carton.

20 Claims, 7 Drawing Sheets

TWO-COMPONENT FOAM DISPENSING KIT

CROSS REFERENCES TO RELATED APPLICATIONS

This application claims the priority benefit of U.S. Provisional Patent Application No. 60/432,408 filed on Dec. 11, 2002.

STATEMENT REGARDING FEDERALLY SPONSORED RESEARCH

Not Applicable.

BACKGROUND OF THE INVENTION

The invention relates generally to a fluid dispensing kit and more particularly to packaging for a portable two-component fluid dispensing kit.

There are numerous applications in which a dispensing fluid, such as a sprayable adhesive, fire retardant, insulation, sealant, and the like, is used at a site for any number of applications. For example, a dispensing fluid comprising a polyurethane foam is used with increasing frequency as a sealant in the building trades for sealing spaces between window and door frames. The foam is also used as an adhesive for gluing flooring and roof tiles. The polyurethane foam for such in situ applications is typically supplied as a one-component froth foam or a two-component froth foam.

A one-component foam includes a dispensing fluid comprising both a resin and isocyanate. The fluid is supplied in a single pressurized container, and is dispensed from the container through a valve or gun attached to the container. A one-component foam is simple to use. Unfortunately, however, one-component foams have a short shelf life because the resin and isocyanate react over time in the single container.

A two-component foam provides foam components in separate containers. One component, such as polymeric isocyanate, fluorocarbons, and the like, is supplied in one pressurized container, while the other component, typically a resin, such as polyols, catalyst, flame retardants, and the like, is supplied in a second pressurized container. The components in the two component kit are typically dispensed simultaneously through a dispensing gun connected to both cylinders by hoses. The dispensing gun mixes the components as they are dispensed.

Typically, two-component kits use pressurized cylinders 6" to 10" in diameter which are connected by the hoses to the dispensing gun. Generally, the cylinders weigh anywhere from 15 to about 30 lbs. and are pressurized with a pressurizing gas at pressures of about 200 psi gage at ambient temperature, 70° F. prior to shipping. The pressurizing gas mixes with the components in the cylinders, and must be an inert gas, such as nitrogen, that will not react with the dispensing fluid. One of the advantages of the two-component system is its relatively long shelf life resulting from the fact that the chemicals are not mixed until they encounter one-another in the dispensing gun.

A two-component kit typically includes the two cylinders, each containing one of the foam components, the dispensing gun, and hoses connecting the cylinders to the gun. These items are generally packaged in a cardboard container, box or carton and the carton is then used to hand carry the items to the site where the foam is to be dispensed. Because the chemicals contained within the cylinders are under a high pressure (i.e. greater than 40 psig), they are deemed hazardous material. Accordingly, the carton must house the cylinders in such a manner that extensive safety regulations are complied with during shipping. Complying with these safety regulations increases the costs of the kit, and limits available modes of shipping.

A typical container for a two-component kit is a cardboard, fold-out box with a separate cardboard tray. The tray fits over the valved ends of the cylinders to hold the cylinders in place in the box during shipment and is integrated into the box such as by folding flaps fitting into tray slots at the box end adjacent the tray. The tray holds the cylinders and the box flaps hold the tray to the box. In the top of the tray, the hoses are placed in a coiled manner with the dispensing gun.

To use, the operator opens the box end adjacent the tray and removes knock-out holes in the front face of the box. The hoses are then placed through the knock-out openings and tightened to the cylinder's valve fitting from above (discarding the protective shipping tubes) and the valves are opened. The cover is then folded back into the box to close the box and the hoses extend out of the box. Because the box end adjacent the tray has to be opened and closed to open and close the valves for use of the dispensing gun, the box is usually provided with a strap at the opposite box end which does not open. This means that the box is carried with the cylinders upside-down. However, this carton is perfectly acceptable for portable, hand-held, polyurethane froth foam in situ applications such as typically encountered in the building trades.

Another known two-component polyurethane froth foam box is disclosed in U.S. Pat. No. 6,283,221, and has cylinders equipped with "dip tubes" which extend through the outlet valve from the inside bottom of the cylinder. The dip tubes allow the cylinders to be placed upright in the box instead of upside down. During shipping, the hoses are coiled and stuffed between the cylinders and a side of the box. Unfortunately, if the kit is dropped or stacked on the side, the hoses and nozzle connected thereto can be damaged. Moreover, the box disclosed in U.S. Pat. No. 6,283,221 includes structure which must be folded and wedged against the cylinders to brace and stabilize the cylinders during shipping.

SUMMARY OF THE INVENTION

The present invention provides a transportable two-component fluid dispensing kit. The kit includes a container having a front panel and rear panel joined by side panels to form a chamber. Each of the panels has a top edge and a bottom edge joined by side edges, each of the side edges are connected to an adjacent side edge to form the chamber. At least one bottom panel having an edge joined to one of the bottom edges closes over the bottom of the chamber. In one embodiment, the front panel top edge includes a cut out forming an access opening. A top panel having a rearward edge joined to the top edge of the rearward panel closes over the top of the chamber, and top side panels extending downwardly from a forward edge and side edges of the top panel overlaps the front panel cut out and the side panels of said chamber.

In another embodiment, a pair of pressure vessels are disposed inside the chamber. Each pressure vessel has a dip tube extending from inside the pressure vessel to a valve disposed at a top of the vessel. In another embodiment, a handle for maintaining a space between valves fixed to pressure vessels received in the carton. A dispensing gun is connected to a hose in fluid communication with each pressure vessel. Each of said hoses have one end connectable to one of the pressure vessels and an opposing end connectable to said dispensing gun.

An objective of the present invention is to provide an improved two-component fluid dispensing kit. The objective is accomplished in one embodiment by providing a two-component fluid dispensing kit with a cut out that improves access to the contents of the carton once the carton cover is opened. In another embodiment, this objective is accomplished by providing a handle that maintains a space between the valves disposed on top of each pressure vessel.

The foregoing and other objects and advantages of the invention will appear from the following description. In the description, reference is made to the accompanying drawings which form a part hereof, and in which there is shown by way of illustration a preferred embodiment of the invention.

DETAILED DESCRIPTION OF THE INVENTION

Figure 1:
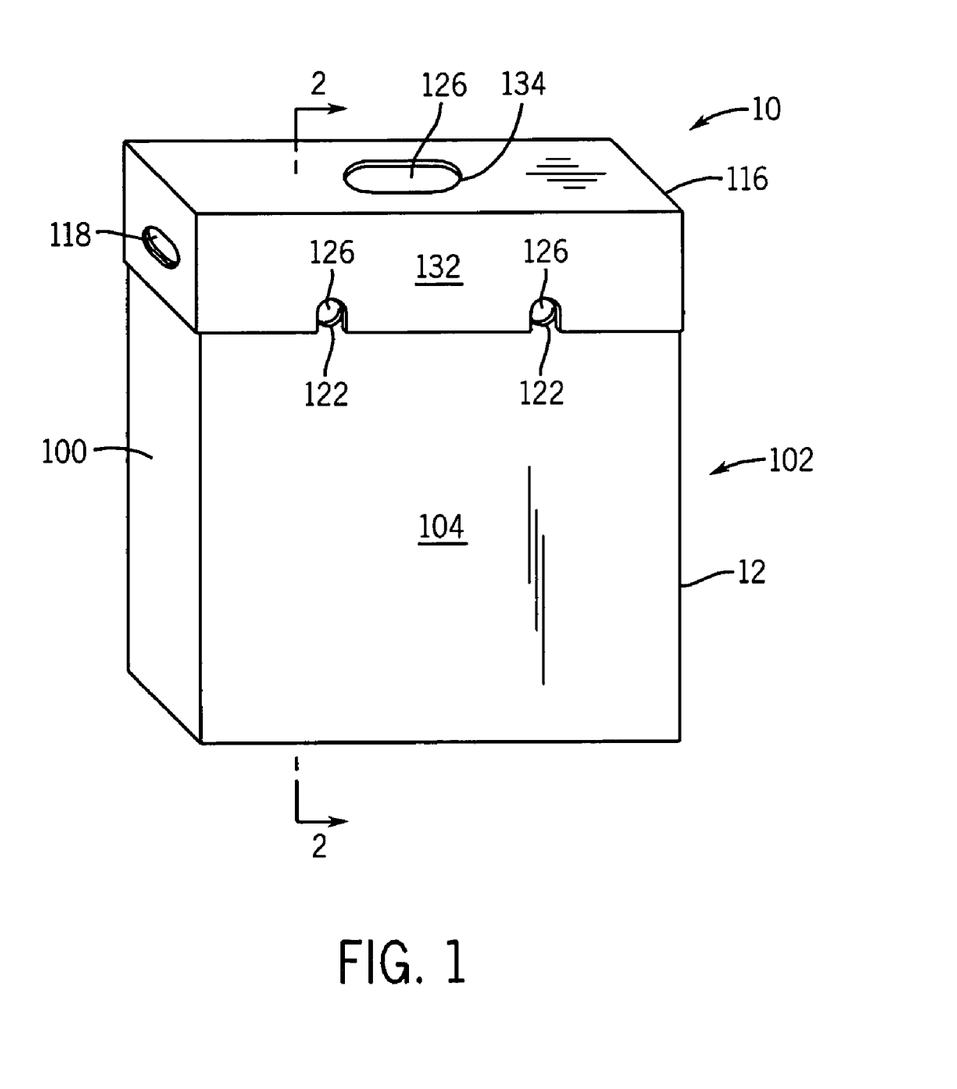
FIG. 1 is a perspective view of a two component fluid dispensing kit incorporating the present invention.
Figure 2:
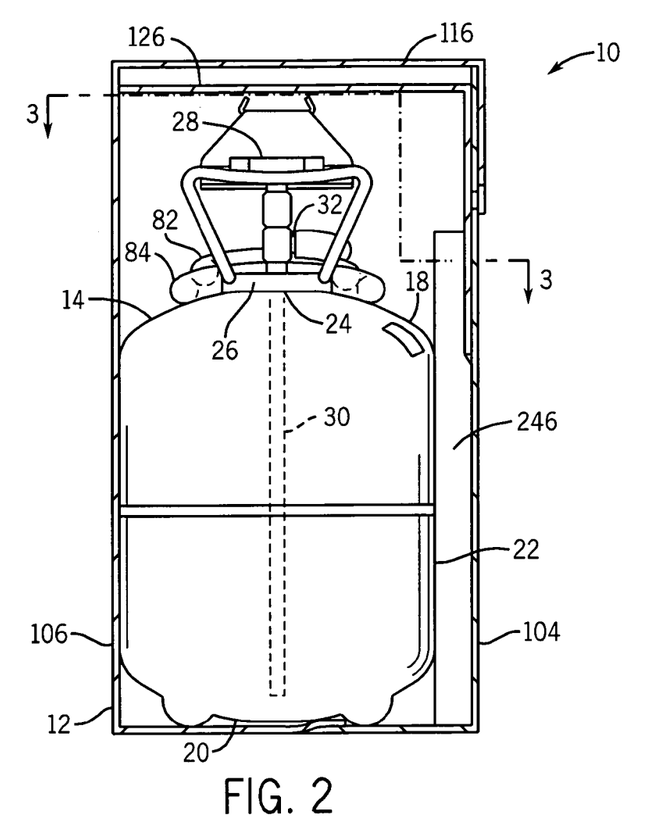
FIG. 2 is a cross sectional view along line 2—2 of FIG. 1.
Figure 3:
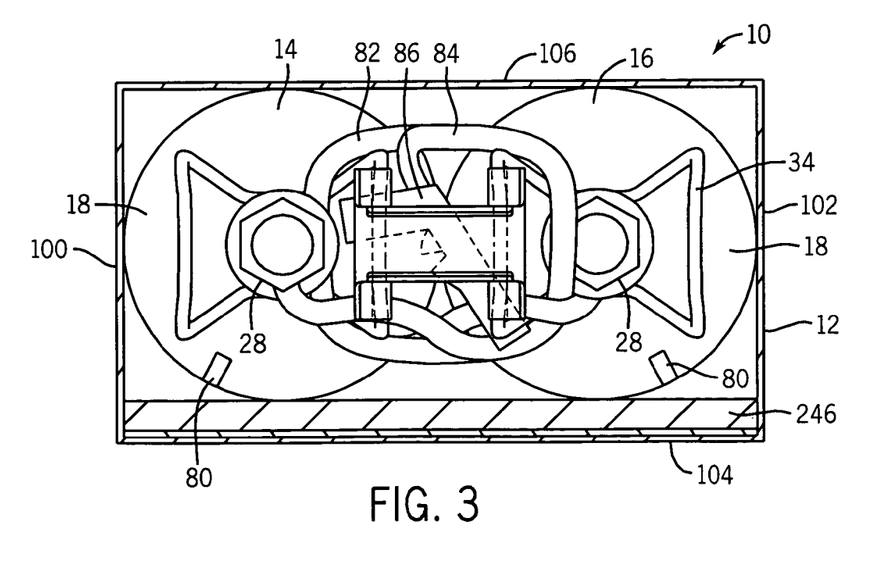
FIG. 3 is a cross sectional view along line 3—3 of FIG. 2.

As shown in FIGS. 1–3, a two-component portable polyurethane foam spray kit 10 includes two pressure vessels, also referred to as cylinders 14, 16, contained within a carton 12. The kit 10 also includes hoses 82, 84 connecting the cylinders 14, 16 to a foam gun 86 through which the foam is dispensed. Advantageously, the carton 12 includes an opening 120 (shown in FIG. 9) that is covered for shipping, and provides easy access to the cylinders 14, 16 when a user opens the carton 12 prior to dispensing foam.

The cylinders 14, 16 are designated by a cylinder diameter, and in one preferred embodiment, the cylinder diameter is 7½". Two-component polyurethane foam kits incorporating the present invention can be supplied with cylinders having any diameter, such as between about 6 to 10" in diameter without departing from the scope of the invention. Each cylinder 14, 16 includes a top 18 and bottom 20 joined by a cylindrical wall 22. An orifice 24 is formed in the cylinder top 18, and is surrounded by a collar 26 forming part of the cylinder top 18.

Preferably, one cylinder, 14 contains an "A" component fluid, such as polymeric isocyanate, and the other cylinder, 16 contains a "B" component fluid, such as polyol amine or resin. Formulations within each cylinder 14, 16 can vary significantly depending on the application. For example, adhesive applications produce a polyurethane foam which has very little, if any, "foam" while insulation applications use a formulation which produces a significant rise in the foam. Usually, portable, hand carried two-component polyurethane foam kits dispense the chemicals from the dispensing gun as a "froth" having a consistency or texture similar to that dispensed from an aerosol can of shaving cream. All such variations in the formulations of polyurethane and whether the chemicals are dispensed as a spray or froth are included within the scope of the present invention so long as the formulations are supplied in a portable, hand carried kit form.

A conventional fluid dispensing manual valve 28 is secured in the orifice 24 in the cylindrical top 18 of each cylinder 14, 16, and permits dispensing the fluid contained within the cylinder 14, 16. The valve 28 is connected to, and in fluid communication with, a dip tube 30 extending from the valve 28 into the respective cylinder 14, 16 toward the cylinder bottom 20. The valve 28 opens and closes fluid communication of the dip tube 30 in the cylinder 14, 16 with a hose fitting 32. A pressure relief (not shown) can also be provided for the cylinder 14 if required by safety regulations or concerns.

Figure 4:
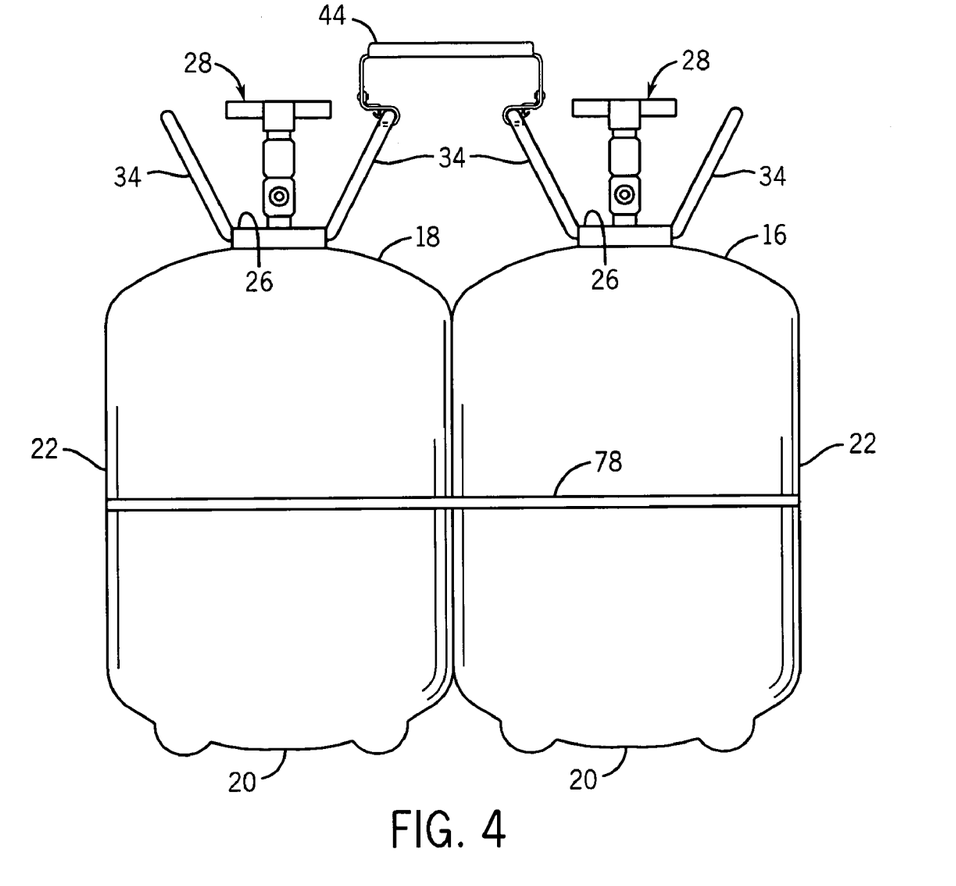
FIG. 4 is a front view of the cylinders of FIG. 3.
Figure 5:
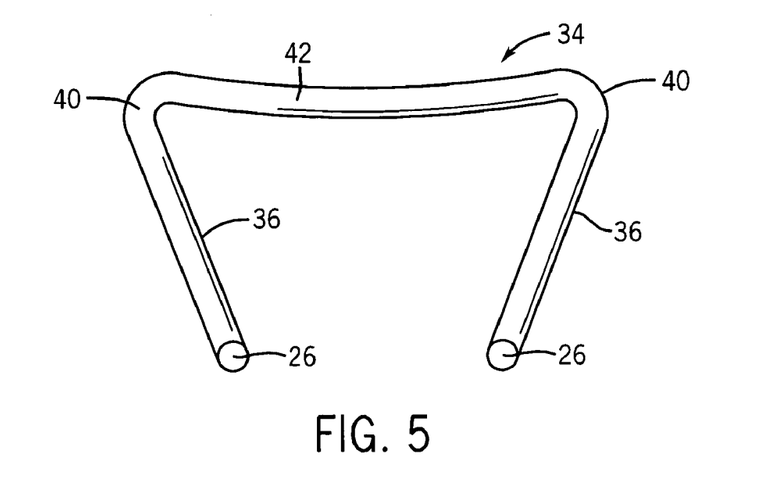
FIG. 5 is a side view of a guard of FIG. 4.

As shown in FIGS. 4 and 5, each cylinder 14, 16 includes a pair of guards 34 extending upwardly from the cylinder top 18 on opposing sides of the fluid dispensing valve 28. Each guard 34 is, preferably, formed from wire approximately ⅜ inches in diameter, and includes a pair of legs 36 having one end 38 fixed to the collar 26 and a second end 40 joined by a connecting member 42. Although a guard 34 formed from wire is preferred, the guard 34 can be formed from any material known in the art, such as stamped metal, molded plastic, and the like, without departing from the scope of the invention.

A rigid handle 44, shown in FIGS. 4–7, engages the connecting member 42 of one of the guards 34 on each of the cylinders 14, 16 to space the cylinder tops 18, and thus the valves 28 at a constant dimension. The handle 44 includes a user grasping portion 46 having opposing ends 52, 54. A leg 50 extending from each end 52, 54 of the user grasping portion 46 includes a distal end 56 that engages the connecting member 42 of one of the cylinders 14, 26. Preferably, the user grasping portion 46 includes upturned longitudinal edges 58 to avoid cutting the user. Advantageously, the handle 44 stabilizes the cylinders 14, 16 relative to each other in the carton 12 to eliminate the need for bracing the cylinder tops 18 during shipping.

Figure 6:
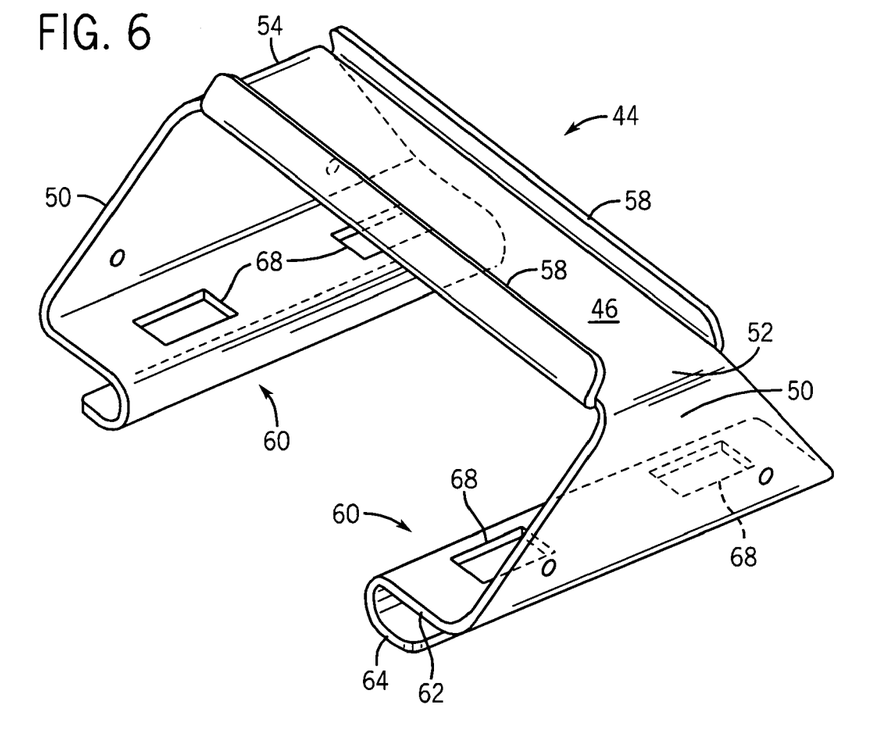
FIG. 6 is a perspective view of the handle of FIG. 4.
Figure 7:
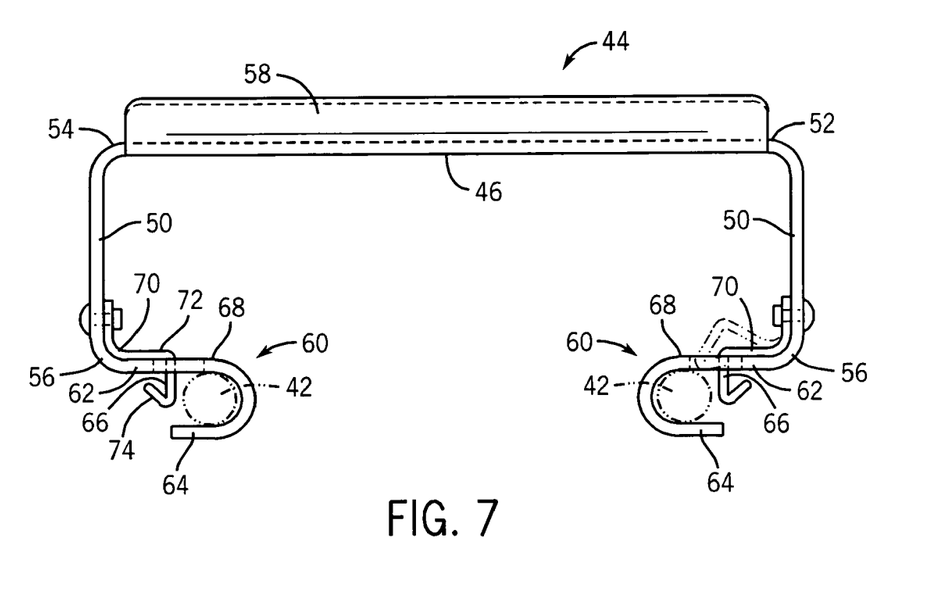
FIG. 7 is a front view of the handle of FIG. 6.

The distal end 56 of each leg 50 forms an outwardly opening hook 60 that engages the connecting member 42 of one of the guards 34. The hook 60 includes an inwardly extending first leg 62 joined to an outwardly extending second leg 64. The hook 60 loops around the connecting member 42 of one of the cylinders 14, 16 with the first leg 62 passing over the connecting member 42 and the second leg 64 passing underneath the connecting member 42.

Each hook upper and lower legs 62, 64 are engagement surfaces that engage the connecting members 42, and preferably extend substantially the entire length of the connecting member 42 to prevent the cylinders 14, 16 from moving forwardly and rearwardly independent of each other. Although both legs 62, 64 of the hook 60 are shown to extend substantially the entire length of the connecting member 42 to restrict forward and rearward movement of the cylinders 14, 16 relative to each other, one or more spaced engagement surfaces can be provided to restrict forward and rearward movement of the cylinders relative to each other without departing from the scope of the invention. For example, a pair of spaced hooks can be provided that extend from each leg to engage a guard connecting member, and restrict forward and rearward movement of the cylinders relative to each other.

A clip 66 extending through an opening 68 formed in the first leg 62 of the hook 60 extends toward the second leg 64 of the hook 60, and retains the connecting member 42 in the hook 60. The clip 66 is biased toward the second leg 64 by a leaf spring 70 fixed to the handle leg 50, such as by a rivet. Preferably, the clip 66 is formed as an integral part of the leaf spring 70, and is joined to a distal end 72 of the leaf spring 70. An upturned portion 74 of the clip distal end 76 extends upwardly and outwardly for engaging the connecting member 42 as the connecting member 42 is urged into the hook 60 between the hook upper and lower lets 62, 64, and urges the clip 66 against the leaf spring 70 to allow the connecting member 42 into the hook past the clip 66. Although a leaf spring biasing the clip is preferred, any biasing member can be used without departing from the scope of the invention.

When the cylinders 14, 16 are lifted by the handle 44, each cylinder 14, 16 pivots about the guard connecting member 42 to which the handle 44 is attached, and the cylindrical wall 22 of each cylinder 14, 16 engage to prevent side movement of the cylinders 14, 16 relative to each other. Raising one end 48 of the handle 44 relative to the other end 48, however, causes the cylinders 14, 16 to move vertically relative to each other. A band 78, shown in FIG. 4, surrounding both cylinders 14, 16 prevents the cylinders 14, 16 from moving vertically relative to each other to further stabilize the cylinders 14, 16 in the carton 12 and when lifting the cylinders 14, 16 by the handle 44. Although a band joining the cylinder bottoms 20 together is shown to prevent vertical relative movement of the cylinders, any method known in the art, such as by shrink wrapping the cylinders together, can be used without departing from the scope of the invention.

A temperature indicator 80, shown in FIG. 3, such as a temperature sensitive strip in the form of a liquid crystal thermometer available from Liquid Crystal Resources LLC, Northbrook, Ill., is fixed to each cylinder top 18 to indicate when the cylinders 14, 16, and thus the fluids contained therein, are at the proper temperature for dispensing the foam. Preferably, each temperature indicator 80 is fixed to the respective cylinder 14, 16 using an adhesive.

Figure 8:
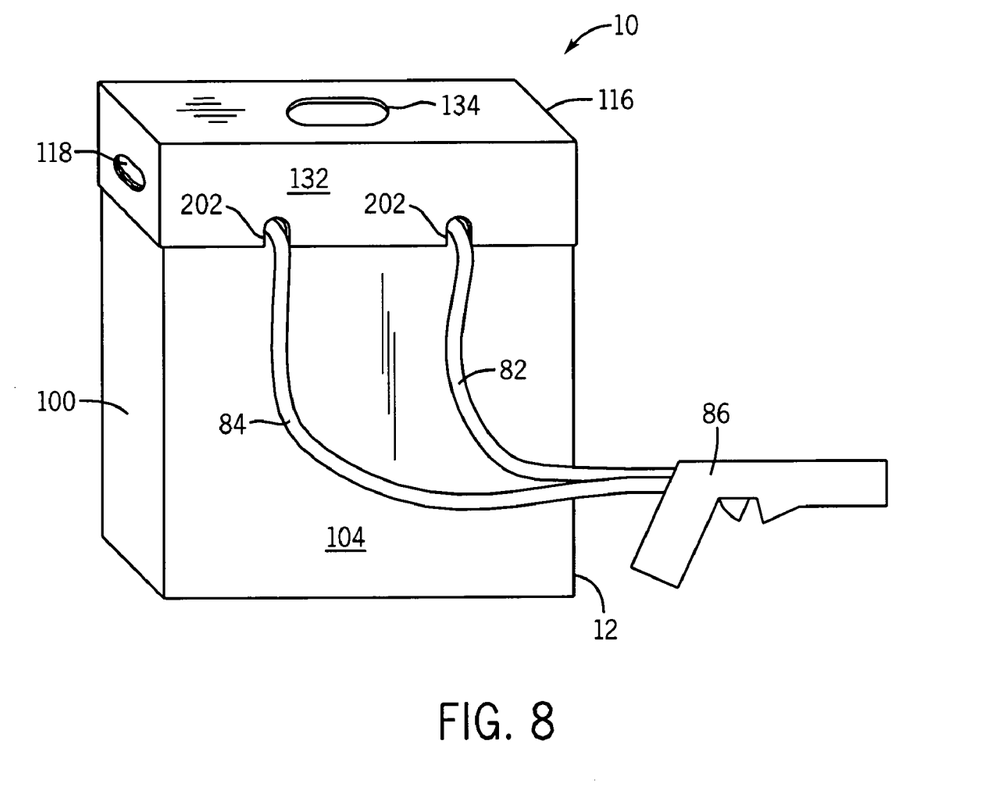
FIG. 8 is a perspective view of the dispensing kit of FIG. 1 in a foam dispensing configuration.

Referring to FIGS. 2, 3, and 8, a hose 82, 84, is connected to each of the fluid dispensing valves 28. Each hose, 82, 84 is connected at its opposite end to a dispensing gun 86. Preferably, the hoses 82, 84 are coiled and stored above the cylinders 14, 16 in the carton 12 for shipping. An example of such a gun can be found in U.S. Pat. No. 5,462,204 to Finn, entitled "Foam Dispensing Gun" (incorporated by reference herein) for a description of a dispensing gun used in a two-component system. The invention, however, is not limited to any specific dispensing gun design.

As shown in FIGS. 1, 2, and 8–10, the carton 12 is a rectangular box, preferably formed from a cardboard blank, and provides a convenient carrying case for the cylinders 14 16, hoses, 82, 84, and dispensing gun 86. The carton 12 includes first and second side panels 100, 102 joined by front and rear panels 104, 106 to form a carton top and bottom. Interlocking bottom panels 108, 110, 112, 114 close the carton bottom, and a cover 116 closes the carton top. Hand openings 118 formed in the side panels 100, 102 and cover 116 are provided for use by the user to carry the kit 10. An access opening 120 cut out of the front panel 104 provides easy access to the valves 28, hoses 82, 84, and nozzle 86 once the carton top is opened by lifting the cover 116. A pair of hose cut outs 122 are also formed in the front panel 104 which allows the hoses 82, 84 to remain connected to the valves 28 after the carton top has been reclosed with the cover 116.

Figure 9:
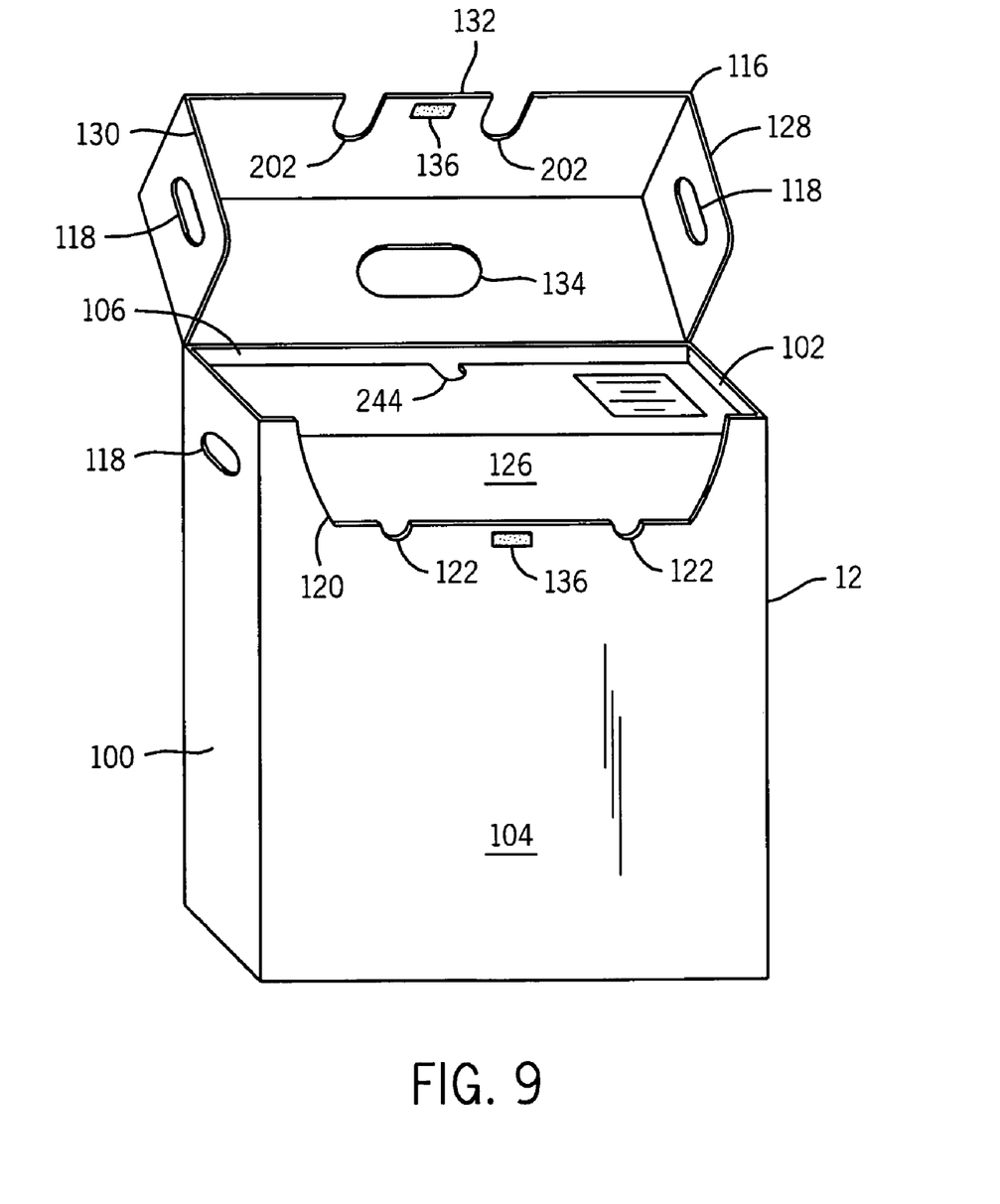
FIG. 9 is a perspective view of the dispensing kit of FIG. 1 with the cover open.
Figure 10:
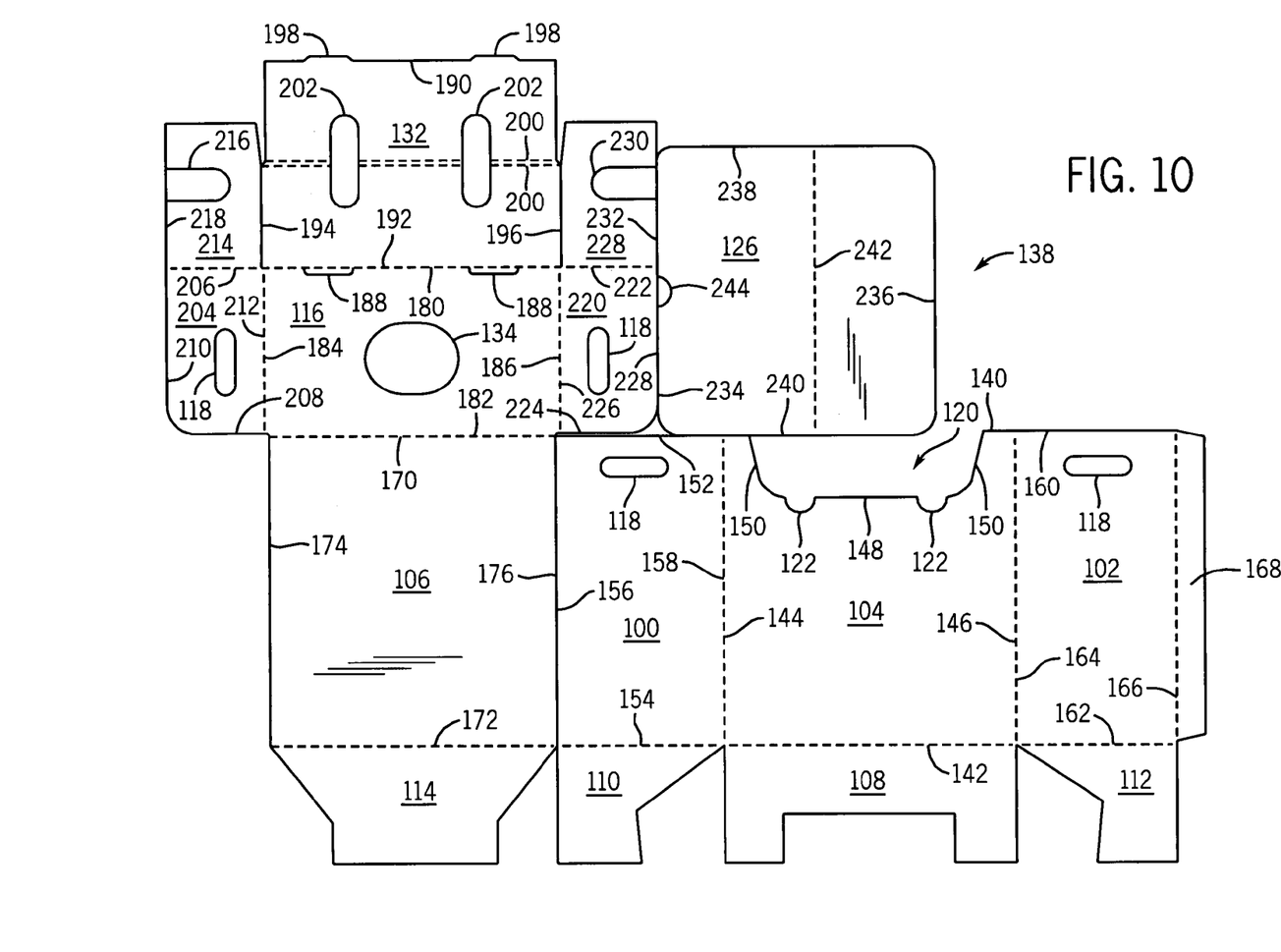
FIG. 10 is a plan view of a blank for forming the carton of FIG. 1.

A removable panel 126 covers the cylinders 14, 16, and during shipping closes the cut outs 122 and openings 120, 134 formed in the carton 12. Advantageously, instructions can be printed on the removable panel 126 which are unavoidably encountered by the user upon opening the kit 10 to avoid uninformed use of the kit 10. Moreover, the removable panel 126 is not necessarily connected or bonded to any other portion of the carton 12, and can easily be removed for reading the instructions. Once the removable panel 126 has been removed and the instructions read, it can be discarded without adversely affecting the utility of the carton 12.

The cover 116 closes over the carton top, and includes vertically extending cover side panels 128, 130 and a cover front panel 132 which overlap a portion of the side panels 100, 102 and front panel 104, respectively. The hand openings 118 formed in the cover side panels 128 are aligned with the hand openings 118 formed in carton side panels 100, 102 when the cover 116 is closed over the carton top. A handle opening 134 formed in the carton cover 116 provides access to the handle 44 connected to the cylinders 14, 16, once the removable panel 126 is removed.

Preferably, the cover front panel 130 is fastened to the carton front panel 104 using a releasable fastener 136, such as a hook and loop fastener, to securely close the cover 116 over the carton top when dispensing the foam or carrying the kit by the handle 44. Although a hook and loop fastener is preferred, other mechanical fasteners, releasable adhesives, and the like can be used to securely close the cover over the carton top without departing from the scope of the invention.

A flat blank 138 forming the carton 12, as shown in FIG. 10, includes the front panel 104 having a top edge 140 and bottom edge 142 joined by first and second side edges 144, 146. In FIG. 10, dashed lines designate fold lines, and solid lines indicate cut lines. The carton front panel 104 includes the U-shaped access opening 120 cut out of the front panel top edge 140. The access opening 120 includes a substantially straight lower edge 148 joined to the front panel top edge 140 at both ends of the lower edge 148 by upwardly extending side edges 150 of the opening 120. Advantageously, the pair of hose cut outs 122 are formed in the lower edge 148 to provide an opening for the hoses 82, 84 when the cover 116 is closed over the access opening 120. The bottom panel 108 joined to the bottom edge 142 of the front panel 104 is shaped to interlock with other bottom panels 110, 112, 114 to close the carton bottom.

The first side panel 100 is joined to the first side edge 144 of the carton front panel 104, and includes a top edge 152 and bottom edge 154 joined by first and second side edges 156, 158. The second side edge 158 of the first side panel 100 is joined to the first side edge 144 of the front panel 104. The bottom panel 110 is joined to the bottom edge 154 of the first side panel 100, and is shaped to interlock with the other bottom panels 108, 112, 114 to close the bottom of the carton 12. One of the punch out hand openings 118 is formed in the first side panel proximal the first side panel top edge 152.

The rear panel 106 is joined to the first side edge 156 of the first side panel 100, and includes a top edge 170 and bottom edge 172 joined by first and second side edges 174, 176. The second side edge 176 of the rear panel 106 is joined to the first side edge 144 of the first side panel 100. The bottom panel 114 is joined to the bottom edge 172 of the rear panel 106, and is shaped to interlock with the other bottom panels 108, 110, 112 to close the bottom of the carton 12.

The second side panel 102 is joined to second side edge 146 of the front panel 104, and includes a top edge 160 and bottom edge 162 joined by first and second side edges 164, 166. The first side edge 164 of the second side panel 102 is joined to the second side edge 146 of the front panel 104. The bottom panel 112 is joined to the bottom edge 162 of the second side panel 102, and is shaped to interlock with the other bottom panels 108, 110, 114 to close the bottom of the carton 12. One of the punch out hand openings 118 is formed in the second side panel 102. A tab 168 joined to the second side edge 166 of the second side panel 102 provides a strip of material for adhesively attaching to an inside surface of the rear panel 106 proximal the first side edge 174 of the rear panel 106 to form the box.

The cover 116 is joined to the top edge 170 of the rear panel 106, and includes a front edge 180 and rear edge 182 joined by first and second side edges 184, 186. The handle opening 134 is formed in the cover 116, and pair of slots 188 are formed in the cover 116 proximal the front edge 180.

The cover front panel 132 is joined to the front edge 180 of the cover 116, and includes a distal edge 190 and proximal edge 192 joined by first and second side edges 194, 196. Tabs 198 extending from the distal edge 190 are received in the slots 188 formed in the cover 116 when the cover front panel 132 is folded 180° along a pair of fold lines 200 extending between the side edges 194, 196 approximately midway between the cover front panel distal and proximal edges 190, 192. A pair of cut outs 202 formed across the fold lines 200 provide clearance for the hose cut outs 122 formed in the carton front panel 104.

A first cover side panel 204 is joined to the first side edge 184 of the cover 116, and includes a front edge 206 and a rear edge 208 joined by first and second side edges 210, 212. The first side edge 184 of the cover 116 is joined to the second side edge 212 of the first cover side panel 204. One of the hand openings 118 is formed in the first cover side panel 204 which aligns with the hand opening 118 formed in the first side panel 100 when the cover 116 is closed over the carton top and the first cover side panel 204 overlaps the first side panel 100.

A first tab 214 joined to the first cover side panel front edge 206 includes a cut out 216 formed in a side edge 218 of the tab 214 which aligns with one of the cut outs 202 formed in the cover front panel 132 when the tab is folded 90° toward and sandwiched between the folded over portions of the cover front panel 132 formed on opposing sides of the fold lines 200 in the cover front panel 132.

A second cover side panel 220 is joined to the second side edge 186 of the cover 116, and includes a front edge 222 and a rear edge 224 joined by first and second side edges 226, 228. The second side edge 186 of the cover 116 is joined to the first side edge 226 of the second cover side panel 220. One of the hand openings 118 is formed in the second cover side panel 220 which aligns with the hand opening 118 formed in the second side panel 102 when the cover 116 is closed over the carton top and the second cover side panel 220 overlaps the second side panel 102.

A second tab 228 joined to the second cover side panel front edge 222 includes a cut out 230 formed in a side edge 232 of the tab 228 which aligns with one of the cut outs 202 formed in the cover front panel 132 when the tab is folded 90° toward and sandwiched between the folded over portions of the cover front panel 132 formed on opposing sides of the fold lines 200 in the cover front panel 132.

The removable panel 126 is preferably formed adjacent to the second side cover panel 220, and includes a rear edge 234 and front edge 236 joined by side edges 238, 240. A fold line 242 extending between the rear and front edges 234, 236 is offset towards the front edge 236 of the panel 126. A finger cut out 244 is formed in the rear edge 234 of the panel 126.

If the cylinders 14, 16 have a small diameter, such as a 7½ inch diameter, the carton 12 may not have sufficient depth between the front and rear panels 104, 106 to fit the coiled hoses 82, 84 in the carton 12 above the cylinders 14, 16 without kinking the houses if the carton is sized, such that the cylinders 14, 16 engage both the front and rear panels 104, 106 of the carton 12. In the present embodiment, the carton depth is sized to allow a space between the cylinders 14, 16 and the front or rear panel 104, 106. Spacers 246 formed from sheets of cardboard are provided to fit between the cylinders 14, 16 and the front or rear panels 104, 106. Advantageously, the spacers 246 prevent the hoses 84, 86 from slipping down between the front or rear panels 104, 106 where they can be crushed. In addition, the spacers 246 provide cushioning for the cylinders 14, 16 during shipping. Although cardboard spacers are preferred, any material, such as paper, plastic, bubble wrap, and the like, can be used to fill the space in the carton and cushion the cylinders without departing from the scope of the invention.

Referring to FIGS. 1–10, the portable two component fluid dispensing kit 10 is assembled by assembling the carton 12 from the blank 138. The carton 12 is assembled by folding the side panels 100, 102 at the side panels first and second edges 156, 158, 164, 166, and adhesively fixing the tab 168 to an inner surface of the rear panel 106 to form a carton chamber. The bottom panels 108, 110, 112, 114 are then interlocked to close the chamber bottom. Of course, an adhesive can be applied to the bottom panels 108, 110, 112, 114 to ensure the bottom panels 108, 110, 112, 114 do not separate.

The cover side panel tabs 214, 228 are folded at the respective cover side panel front edges 206, 222 and the cover side panels 204, 220 are folded at the respective cover side edges 184, 186. The cover front panel 132 is folded over the fold lines 200 to sandwich the cover side panel tabs 214, 228 between the folded portions of the cover front panel 132. The tabs 190 extending from the distal edge 190 of the cover front panel 132 are received in the slots 188 proximal the cover front edge 180 to hold the cover front panel portions folded over the cover side panel tabs 214, 228.

The cylinders 14, 16 are then banded and slipped into the carton 12. The spacers 246 can then be inserted between the cylinders 14, 16 and either the front or rear panel 104, 106. The handle 44 is affixed to the cylinders 14, 16 by snapping the connecting member 44 of one of the guards 34 on each cylinder 14, 16 into one of the hooks 60 formed on each leg 50 of the handle 44. Of course, the handle can be attached to the cylinders prior to slipping the cylinders into the carton without departing from the scope of the invention.

The hoses 82, 84 can be connected to the fluid dispensing valves 28 for shipping or be loose for connection to the fluid dispensing valves 28 by the user at the point of use. The coiled hoses 82, 84 are then laid over the cylinder tops, preferably surrounding the handle 44. The removable panel 126 is slipped over the cylinders 14, 16 to cover the carton contents and close the handle opening 134 in the cover 116 and between the cylinders 14, 16 and the front panel 104 to close off the hose cut outs 112 and access opening 120 formed in the front panel 104. The cover 116 is then pivoted over the carton top, and the cover front panel 132 is releasably fastened to the carton front panel 104. The cover 116 can also be held shut by bands during shipping to inhibit unintentional opening of the carton 12.

The kit 10 is used by cutting away any banding holding the cover 116 closed, and pivoting the cover 116 away from the carton top to expose the removable panel 126. Instructions on the removable panel 126 are read, and the temperature indicator 80 checked to ensure the cylinders 14, 16 are at the correct dispensing temperature. The removable panel 126 can then be discarded.

If the hoses 82, 84 are not connected to the valves 28, they are connected, and each hose 82, 84 is inserted into one of the hose cut outs 122 formed in the front panel 104. The valves 28 are opened to allow fluid from the cylinders 14, 16 to flow to the gun 86 for dispensing the foam, and the cover 116 is closed over the carton top. Advantageously, the cover front panel 130 does not overlap the hose cut outs 122 to allow the cover 116 to close over the carton top without interfering with the hoses 82, 84 extending through the hose cutouts 122. The kit 10 can be carried while dispensing foam by grasping the handle 44 through the handle opening 134 formed in the cover 116. Advantageously, the handle 44 inhibits forward and rearward movement of the cylinders 14, 16 relative to each other which can damage the carton 12.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention.

We claim:

1. A transportable two-component fluid dispensing kit, said kit comprising:
  a main container body having a front panel and a rear panel joined by side panels to form a chamber having a top and a bottom, each of said panels having a top edge and a bottom edge joined by vertically extending side edges, each of said side edges being connected to an adjacent side edge to form said chamber, and at least one bottom panel having an edge joined to one of said bottom edges for closing over the bottom of the chamber, said front panel including a cut out forming an access opening in said front panel at said top edge of said front panel, and a cover including at least one top panel having a rearward edge joined to said top edge of said rearward panel for closing over the top of said chamber, and a cover front panel extending downwardly from a forward edge of said top panel which overlaps said front panel cut out of said chamber while in a closed position; said front panel top edge having hose access openings adjoining the front panel cut out, and said cover front panel having a bottom edge with hose access openings that partially overlap the front panel hose access openings;
  a first pressure vessel disposed inside said chamber, and having a dip tube extending from inside said pressure vessel to a first valve disposed at a top of said vessel;
  a second pressure vessel disposed inside said chamber adjacent said first pressure vessel, and having a dip tube extending from inside said second pressure vessel to a second valve disposed at a top of said second pressure vessel; and
  a dispensing gun and hose for each pressure vessel, each of said hoses having one end connectable to one of said pressure vessels and an opposing end connectable to said dispensing gun.

2. A fluid dispensing kit as in claim 1, in which a rigid handle engages each of said pressure vessels for lifting said pressure vessels together and maintaining a space between said first and second valves.

3. A fluid dispensing kit as in claim 2, in which a guard is fixed to each of said pressure vessels, and said handle engages said guards.

4. A fluid dispensing kit as in claim 2, in which said handle includes a user grasping portion interposed between engagement portions, and said engagement portions include an engagement surface extending transverse to an axis defined by said user grasping portion, wherein said engagement surface prevents movement of said first pressure vessel in the forward and rearward direction independent of movement of the second pressure vessel in the forward and rearward direction.

5. The fluid dispensing kit as in claim 1, in which said first pressure vessel contains a resin, and said second pressure vessel contains an isocyanate.

6. The fluid dispensing kit as in claim 1, in which a top side panel extends downwardly from each side edge of said top panel and overlaps one of said side panels of said chamber.

7. The fluid dispensing kit as in claim 1, in which a removable cover disposed in said chamber extends over said cylinders and between said pressure vessels and at least one of said panels.

8. The fluid dispensing kit as in claim 7, in which said removable cover closes openings formed in said container for shipping.

9. The fluid dispensing kit as in claim 1, in which a spacer is inserted between said pressure vessels and at least one of said front panel and said rear panel.

10. The fluid dispensing kit as in claim 1, in which at least one hose cut is formed in an edge of said cut out, and said top side panels do not cover said at least one hose cutout when said top side panel overlaps said cut out.

11. A transportable two-component fluid dispensing kit, said kit comprising:
  a main container body having a front panel and a rear panel joined by side panels to form a chamber having a top and a bottom, each of said panels having a top edge and a bottom edge joined by vertically extending side edges, each of said side edges being connected to an adjacent side edge to form said chamber, and at least one bottom panel having an edge joined to one of said bottom edges for closing over the bottom of the chamber; said front panel including a cut out forming an access opening in said front panel at said top edge of said front panel, and a cover including at least one top panel having a rearward edge joined to said top edge of said rearward panel for closing over the top of said chamber, and a cover front panel extending downwardly from a forward edge of said top panel which overlaps said front panel cut out, in which a top side panel extends downwardly from each side edge of said top panel and overlaps one of said side panels of said chamber while in a closed position; said front panel top edge having hose access openings adjoining the front panel cut out, and said cover front panel having a bottom edge with hose access openings that partially overlap the front panel hose access openings;
  a first pressure vessel disposed inside said chamber, and having a dip tube extending from inside said pressure vessel to a first valve disposed at a top of said vessel;
  a second pressure vessel disposed inside said chamber adjacent said first pressure vessel, and having a dip tube extending from inside said second pressure vessel to a second valve disposed at a top of said second pressure vessel; and a rigid handle engaging each of said pressure vessels for lifting said pressure vessels together and maintaining a space between said first and second valves.

12. The fluid dispensing kit as in claim 11, in which at least one hose cut out is formed in an edge of said cut out, and said top side panels do not cover said at least one hose cut out when said top side panel overlaps said front panel cut out.

13. A fluid dispensing kit as in claim 11, including a dispensing gun and hose for each pressure vessel, each of said hoses having one end connectable to one of said pressure vessels and an opposing end connectable to said dispensing gun.

14. A fluid dispensing kit as in claim 11, in which a guard is fixed to each of said pressure vessels, and said handle engages said guards.

15. A fluid dispensing kit as in claim 11, in which said handle includes a user grasping portion interposed between engagement portions, and said engagement portions include an engagement surface extending transverse to an axis defined by said user grasping portion, wherein said engagement surface prevents movement of said first pressure vessel in the forward and rearward direction independent of movement of the second pressure vessel in the forward and rearward direction.

16. The fluid dispensing kit as in claim 11, in which said first pressure vessel contains a resin, and said second pressure vessel contains an isocyanate.

17. The fluid dispensing kit as in claim 11, in which a removable cover disposed in said chamber extends over said cylinders and between said pressure vessels and at least one of said panels.

18. The fluid dispensing kit as in claim 17, in which said removable cover closes openings formed in said container for shipping.

19. The fluid dispensing kit as in claim 11 in which a spacer is inserted between said pressure vessels and at least one of said front panel and said rear panel.

20. A container for transporting a two-component fluid dispensing system, said container comprising:

a main container body having a front panel and a rear panel joined by side panels to form a chamber having a top and a bottom, each of said panels having a top edge and a bottom edge joined by vertically extending side edges, each of said side edges being connected to an adjacent side edge to form said chamber, and at least one bottom panel having an edge joined to one of said bottom edges for closing over the bottom of the chamber; said front panel including a cut out forming an access opening in said front panel at said top edge of said front panel, and a cover including at least one top panel having a rearward edge joined to said top edge of said rearward panel for closing over the top of said chamber, and a cover front panel extending downwardly from a forward edge of said top panel which overlaps said front panel cut out, in which a top side panel extends downwardly from each side edge of said top panel and overlaps one of said side panels of said chamber while in a closed position; said front panel top edge having hose access openings adjoining the front panel cut out, and said cover front panel having a bottom edge with hose access openings that partially overlap the front panel hose access openings;

wherein said container is adapted to receive pressure vessels of the fluid dispensing system and hoses are selectively receivable through the hose access openings when the container is in the closed position.

\* \* \* \* \*